July 31, 1956  G. W. RATHENAU ET AL  2,756,595
TEMPERATURE MEASURING DEVICE
Filed Oct. 1, 1952

INVENTORS
Gerhart Wolfgang Rathenau
Hermanus Joannes Roosdorp
Johannes Meyer Cluwen
BY
Fred M Vogel
AGENT

United States Patent Office 2,756,595
Patented July 31, 1956

2,756,595

TEMPERATURE MEASURING DEVICE

Gerhart Wolfgang Rathenau, Hermanus Joannes Roosdorp, and Johannes Meyer Cluwen, Eindhoven, Netherlands, assignors to Hartford National Bank and Trust Company, Hartford, Conn., as trustee Application October 1, 1952, Serial No. 312,577

Claims priority, application Netherlands October 4, 1951

6 Claims. (Cl. 73—339)

This invention relates to temperature measuring device and, in particular, to temperature-measuring devices employing a permanent magnet.

According to the invention, a temperature-measuring or control device comprises a permanent magnet having a high temperature-coefficient of remanence and therefore the characteristic of changing its remanence ($B_r$) and field strength with changes in temperature, and means responsive to the change in remanence and field strength of the permanent magnet to actuate suitable indicating means or a further control circuit.

Permanent magnet materials suitable for application in a temperature-measuring device according to the invention are characterised by negative interaction between at least two crystal sublattices. It has been found that permanent magnet materials having negative interaction between at least two crystal sublattices will exhibit a high temperature coefficient of remanence over a very wide range of temperatures which makes them extremely suitable for employment in a magnetic temperature-measuring device.

The invention will now be described with reference to the accompanying drawing in which.

Figure 1:
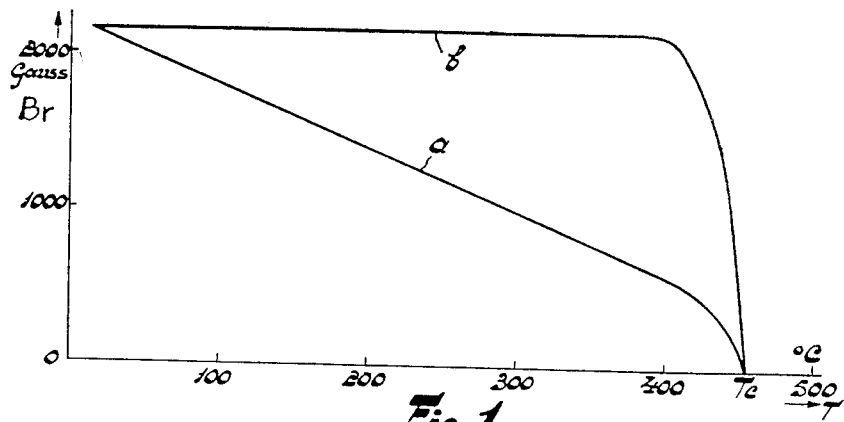
Fig. 1 is a graph showing curves of remanence ($B_r$) versus temperature for two different permanent magnet materials.

Fig. 1 shows two remanence ($B_r$) versus temperature characteristics of two permanent magnet materials, respectively. Curve $b$ is the characteristic of a permanent magnet material which is unsuitable for application in a device according to the invention. With such materials, which exhibit a low temperature coefficient of remanence at temperatures which are low as compared to the Curie temperature, the magnetic moments of the atoms wtihin a Weiss domain are found to be directed in parallel at lower temperatures. It is obvious that a material exhibiting the characteristic $b$ in Fig. 1 is unsuitable for application in a magnetic temperature-measuring device.

It has been found that particular permanent magnet materials which are characterised by crystal sublattices of crystallographically equivalent ions having magnetic moments equally directed within the sublattice and the magnetic moments of at least two crystal sublattices are directed antiparallelwise at lower temperatures will exhibit high temperature coefficients of remanence in a range extending from slightly below the Curie temperature to many degrees below room temperature as shown by curve $a$ in Fig. 1. In other words, a permanent magnet material suitable for application in a device according to the invention must be characterised by a high temperature coefficient of remanence, which property will chiefly be found among those materials exhibiting negative interaction between at least two crystal sublattices. A permanent magnet material exhibiting this negative interaction property will produce a magnetic field whose strength will be determined by the temperature of the environment in which the magnet is placed. Examples of materials which meet this requirement are the permanent magnet materials described in British Patent No. 708,127, which materials are characterised by a composition substantially consisting of non-cubic crystals consisting principally of a composite oxide of iron, an oxide of at least one of the metals barium, strontium and lead, and if desired, a small amount of calcium. The curve $a$ in Fig. 1 is the characteristic of one of those materials, namely, magnetoplumbite structure having a composition $BaO.6Fe_2O_3$ and has a temperature coefficient of about $0.2\%/°$ C. The same coefficient is exhibited by this material at temperatures below room temperature to about $-200°$ C. A further example of a suitable permanent magnet material is cobalt ferrous ferrite.

In the description hereinafter, whenever a reference is made to a negative interaction permanent magnet material, it is to be understood to mean a material exhibiting negative interaction between at least two crystal sublattices.

Figure 2:
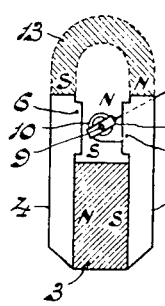
Fig. 2 shows a temperature-measuring device according to the invention for measuring ambient temperatures.

Fig. 2 shows a magnetic temperature measuring device for measuring ambient temperatures. The device comprises a negative interaction permanent magnet 3 having a direction of magnetization N. S. and included in a ferromagnetic circuit comprising ferromagnetic parts 4 and 5, for example of soft iron. The extremities of the parts 4, 5 form two polepieces 6 and 7, which co-operate with an auxiliary magnet 8 of, for example, some permanent magnet material which does not exhibit the negative interaction property. The auxiliary magnet 8 has a direction of magnetisation N–S and is rotatable around a shaft 9, its rotation being counteracted by a helical spring 10. An index 11, which co-operates with a graduated scale 12, is connected to the magnet 8 or the shaft 9.

The negative interaction permanent magnet 3 produces a field between the pole-pieces 6 and 7, the strength of which varies with temperature in accordance with curve $a$ of Fig. 1. Consequently, at low temperatures, the magnet 8 will be drawn to the pole-pieces 6 and 7 more strongly than at high temperature, so that the index 11 indicates different points on the scale 12 at different temperatures.

Since the magnet 8 is subject to the influence of a comparatively large magnetic field between the pole-pieces 6 and 7, of which only a comparatively small variation is to be measured, the device so far described has a relatively low sensitivity. This sensitivity may be increased by compensating for a large portion of the said field, for example with the use of a magnet 13, shown in dotted line, which is provided in parallel with the pole-pieces 6 and 7 and which consists of conventional permanent magnet material having a low coefficient of temperature.

Alternatively, it is also possible for the permanent magnet 13 to have a direction of magnetisation opposite to that of the negative interaction permanent magnet 3 and to be arranged in series in the magnetic circuit 6—4—3—5—7 (not shown), in which event the first-mentioned magnet 13 preferably produces a field larger than that produced by the last-mentioned magnet 3.

Figure 3:
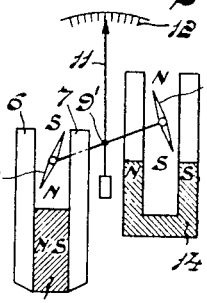
Fig. 3 shows a modification of the device shown in Fig. 2 which exhibits a high sensitivity.

Fig. 3 shows a temperature measuring device in which an increase in sensitivity is obtained by bringing a second auxiliary magnet 8' provided on a shaft 9' under the influence of a permanent magnet 14 of conventional material (curve b), which brings about rotation in the opposite sense. By a suitable arrangement of the magnetic systems, for example, in the manner as shown, the spring 10 of Fig. 2 may be dispensed with.

Figure 4:
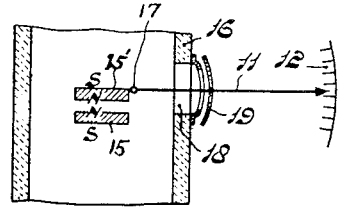
Fig. 4 shows a device according to the invention for measuring comparatively high temperatures, which is characterised by simplicity and a large measuring range.

Fig. 4 shows a device for measuring the temperature within, for example, a wall 16 of a furnace comprising two negative interaction permanent magnets 15 and 15' having opposite directions of magnetization N-S, which thus exert a greater or smaller repelling action upon one another as a function of temperature. The upper magnet 15' is connected to an index 11, which is rotatable about a shaft 17; the lower magnet 15 being rigidly arranged with respect to the said shaft 17. Due to magnetic repulsion and gravity, the magnet 15 assumes a position of equilibrium which varies with temperature, so that the indication of index 11 on the scale 12 is a measure of temperature. The index 11 extends through an aperture 18 provided in the wall 16 of the furnace, the loss of heat from the furnace being avoided by means of a washer 19 secured to the index 11.

The measuring range of the device shown in Fig. 4 is from below room temperature to approximately 400° C. At low temperatures, below approximately —100° C., the negative interaction permanent magnets must have a thickness sufficiently great to be resistant to their mutual demagnetizing fields, since the coercive field strength $$\frac{H}{BC}$$

starts to decrease considerably at low temperatures. If desired, the magnets may alternatively be magnetized in their longitudinal direction, so that, for example, the two north poles are formed at the left-hand ends of the magnets and the two south poles are formed at the right-hand ends thereof.

Figure 5:
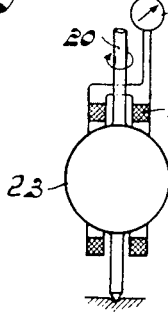
Figs. 5 and 6 show temperature-measuring devices in which the recording means is located at a distance from the responsive means.

Fig. 5 shows a device according to the invention in which a negative interaction permanent magnet 23 is secured to a shaft 20, which is set into rotation, for example, by coupling with a rotary engine part (not shown) present in the device or by means of an auxiliary motor (not shown), preferably a synchronous motor. The alternating magnetic field induced in a winding 21 by the rotating magnet 23 is variable with temperature as a function of the residual inductance of the magnet 23, so that the voltage between the ends of the winding 21, which is supplied after being amplified, if desired, to a voltmeter 22, is a measure of temperature. Since it is unnecessary for the meter 22 to be positioned in the vicinity of the measuring system, indications at a distance from the place of temperature measurement is made possible.

A modification of the device shown in Fig. 5 is obtained by fixing the negative interaction permanent magnet 23 and causing rotation of the winding 21. Alternatively, the winding 21 and the permanent magnet 23 may be caused, for example, to perform an oscillatory movement with respect to one another, so that an alternating magnetic field varying with temperature is produced and the voltage at the extremities of winding 21 is a measure of temperature.

Figure 6:
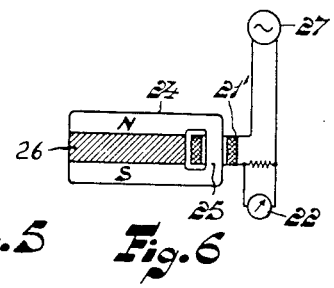

The device shown in Fig. 6 comprises a ferromagnetic circuit 24 including a portion 25, surrounded by a winding 21, premagnetized by a negative interaction permanent magnet 26 to such an extent that the permeability of the portion 25 becomes a function of the field produced by the magnet 26 and, hence, of temperature. The inductance of the winding 21' is thus a measure of temperature, the value of which may be read with the use of an auxiliary-voltage source 27 and an ammeter 22.

Similarly as shown in Fig. 5, the meter 22 may be arranged at a distance from the place of temperature measurement.

Figure 7:
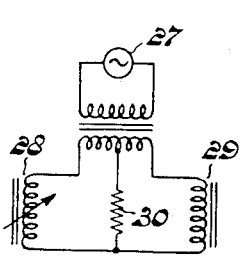
Fig. 7 shows a thermostat circuit for use with the device shown in Fig. 6.

Fig. 7 shows a circuit arrangement for the device shown in Fig. 6 when it is desired to use that device to maintain a given area at a constant temperature. The measuring system 3, 21', 25 shown in Fig. 6 is indicated diagrammatically in Figure 7 by an inductance 28 varying with temperature. The variable inductance 28 is included in a bridge circuit comprising a second inductance 29, which is approximately constant, and a resistance heating coil 30, which is included in the branch of the bridge. The inductance 29 is approximately equivalent to the inductance 28, if the premagnetizing field of the latter due to the magnet 26 is equal to zero. The inductance 28 and the heating resistor 30 are provided in the area which is to be maintained at a constant temperature. If the temperature decreases below a predetermined value, the inductance 28 will decrease in value as a result of the larger premagnetizing field, so that the current traversing the resistance heating coil 30 increases and the increased amount of heat produced by this coil 30 counteracts the initial decrease in temperature.

Figure 8:
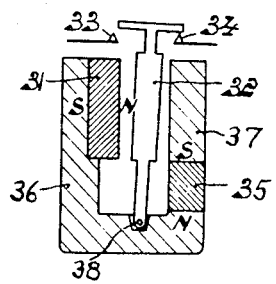
Fig. 8 shows a device according to the invention suitable for control purposes.

Fig. 8 shows a device according to the invention which is suitable for control purposes comprising a magnetic circuit consisting of a negative interaction permanent magnet 31, a second permanent magnet 35 of some conventional permanent magnet material, ferromagnetic core parts 36 and 37, and a ferromagnetic armature 32 pivotable about a shaft 38. The armature 32 is subject to the opposite attractions exerted by the permanent magnet 31 and the ferromagnetic part 5 of the magnetic circuit, so that the armature 32 will pivot to the left or to the right as a function of the value of the field of the permanent magnet 31, thereby closing either a contact 33 or a contact 34. Since the field of the permanent magnet 31 is variable with temperature, the contacts 33 and 34 will be closed within two temperature limits, so that control of temperature is rendered possible within the said limits.

The temperature at the area of the measuring system (temperature being measured) may not be equal to the temperature desired, but there will be only a fixed difference between the two temperatures. Consequently, a satisfactory control may be assured by a suitable choice of the control time-constants.

The devices shown in Figs. 2 to 8 also permit measurements or controls so that the index 11, for example, is always actuated back to the same point on the graduated scale by varying the magnetic circuit. Thus, for example, in the device shown in Fig. 4, the permanent magnet 15 may be moved in the vertical direction a distance such that the index 11 always indicates the same point on the scale 12, the movement of the magnet 15 then being a measure of temperature. As a further alternative the magnet 15' may be provided with a reflecting upper surface, the magnet 15 being arranged in such manner that the light originating from a luminous slit is always reflected by the reflecting surface in the same direction.

While we have thus described our invention with specific explanations and embodiments thereof, other modifications will be readily apparent to those skilled in the art without departing from the spirit and the scope of the invention as defined in the appended claims.

What we claim is:

1. A temperature measuring device comprising a pair of spaced permanent magnets in repelling relationship, said magnets consisting principally of ferromagnetic material having negative interaction between at least two crystal sublattices and being composed of non-cubic crystals consisting principally of a composite oxide of iron and at least one of the metals selected from the group consisting of barium, strontium and lead, whereby the magnets exhibit the characteristic of changing the field strength produced by it in response to a change in ambient temperature, one of said magnets being movable with respect to the other of said magnets so that the spacing therebetween varies with a variation in field strength, and means responsive to the change in spacing between the magnets to indicate the ambient temperature.

2. A temperature-responsive device comprising a first permanent magnet consisting principally of ferromagnetic material having negative interaction between at least two crystal sublattices whereby the magnet exhibits the characteristic of changing the strength of the magnetic field produced thereby in response to a change in its temperature, said ferromagnetic material being composed of non-cubic crystals consisting principally of a composite oxide of iron and at least one of the metals selected from the group consisting of barium, strontium and lead, means arranged to produce a second magnetic field independently of the said first permanent magnet, said means being positioned relative to the said magnet so that from the interaction of the several fields a force on the said means arises which is related to the temperature of the said magnet, and means associated with the second field-producing means and adapted to produce a utilizable response representative of at least one value of said force.

3. A temperature-responsive device as set for in claim 2 wherein the second magnetic field-producing means comprises a second permanent magnet having a small temperature coefficient of remanence and mounted in a position at which its magnetic field opposes that produced by said first permanent magnet.

4. A temperature responsive device comprising a first permanent magnet having a high temperature coefficient of remanence within a range of at least between ambient temperature and a temperature slightly below the Curie point of the magnet and consisting principally of ferromagnetic material having negative interaction between at least two crystal sublattices whereby the magnet exhibits the characteristic of changing the strength of the magnetic field produced thereby in response to a change in its temperature, said ferromagnetic material being composed of non-cubic crystals consisting principally of a composite oxide of iron and at least one of the metals selected from the group consisting of barium, strontium, and lead, a second permanent magnet having a low temperature coefficient of remanence mounted in a position producing a field opposing that of said first magnet, a movable ferromagnetic member mounted within both of the magnetic fields of said permanent magnets and adapted to occupy a position dependent upon those fields, and means coupled to said movable member for producing a response to a change in the temperature of the first permanent magnet.

5. A temperature-responsive device as set forth in claim 4 wherein the last-named means includes an indicating member for indicating the temperature of the first permanent magnet.

6. A temperature-responsive device comprising a first permanent magnet consisting principally of ferromagnetic material having negative interaction between at least two crystal sublattices whereby the magnet exhibits the characteristic of changing the strength of the magnetic field produced thereby in response to a change in its temperature, said ferromagnetic material being composed of non-cubic crystals consisting principally of a composite oxide of iron and at least one of the metals selected from the group consisting of barium, strontium and lead, a second permanent magnet constituted of the same material as said first permanent magnet and mounted to produce a field opposing that of said first magnet and adapted to undergo variations in an operating condition as determined by the strength of said permanent magnets, and means coupled to said second permanent magnet for utilizing said variations to produce a response to the change of temperature of said permanent magnets.

References Cited in the file of this patent

UNITED STATES PATENTS

| 1,742,138 | Faus | Dec. 31, 1929 |
| 1,945,378 | Robbins | Jan. 30, 1934 |
| 2,350,329 | Hornfeck | June 6, 1944 |
| 2,460,773 | Stimson | Feb. 1, 1949 |

FOREIGN PATENTS

| 655,747 | France | Dec. 22, 1928 |
| 655,429 | Great Britain | July 18, 1951 |